United States Patent [19]
Billups

[11] 3,849,852
[45] Nov. 26, 1974

[54] METHOD AND CUTTING EDGE ARRANGEMENT FOR MATERIAL REMOVAL

[76] Inventor: James Otis Billups, Moon, Va. 23119

[22] Filed: June 4, 1973

[21] Appl. No.: 366,719

Related U.S. Application Data
[63] Continuation-in-part of Ser. No. 167,985, Aug. 2, 1971, abandoned.

[52] U.S. Cl. .................................. 29/95.1, 90/64
[51] Int. Cl. ......................................... B23p 15/42
[58] Field of Search .......................... 29/95.1; 90/64

[56] References Cited
UNITED STATES PATENTS

| | | | |
|---|---|---|---|
| 1,364,561 | 1/1921 | La Pointe | 29/95.1 |
| 2,656,590 | 10/1953 | Hooper | 29/95.1 |
| 3,262,183 | 7/1966 | Raehrs | 29/95.1 |
| 3,566,494 | 3/1971 | Robinson | 29/95.1 |

*Primary Examiner*—Leonidas Vlachos
*Attorney, Agent, or Firm*—Pastoriza & Kelly

[57] ABSTRACT

Material removal from a workpiece is accomplished using a new modular cutting edge arrangement, each cutting edge so proportioned as to cut discreet widths of material regardless of the total engagement of the cutting edges with the workpiece. The positions of the cutting edges within the module are controlled in two directions: F in the direction of travel; and P, perpendicular to the direction of travel. The control is such that each cutting edge removes essentially the same width of material measured in the P direction while it is moving in the F direction. A total tool can include any number of modules continued in either or both directions F and P.

4 Claims, 4 Drawing Figures

PATENTED NOV 26 1974    3,849,852
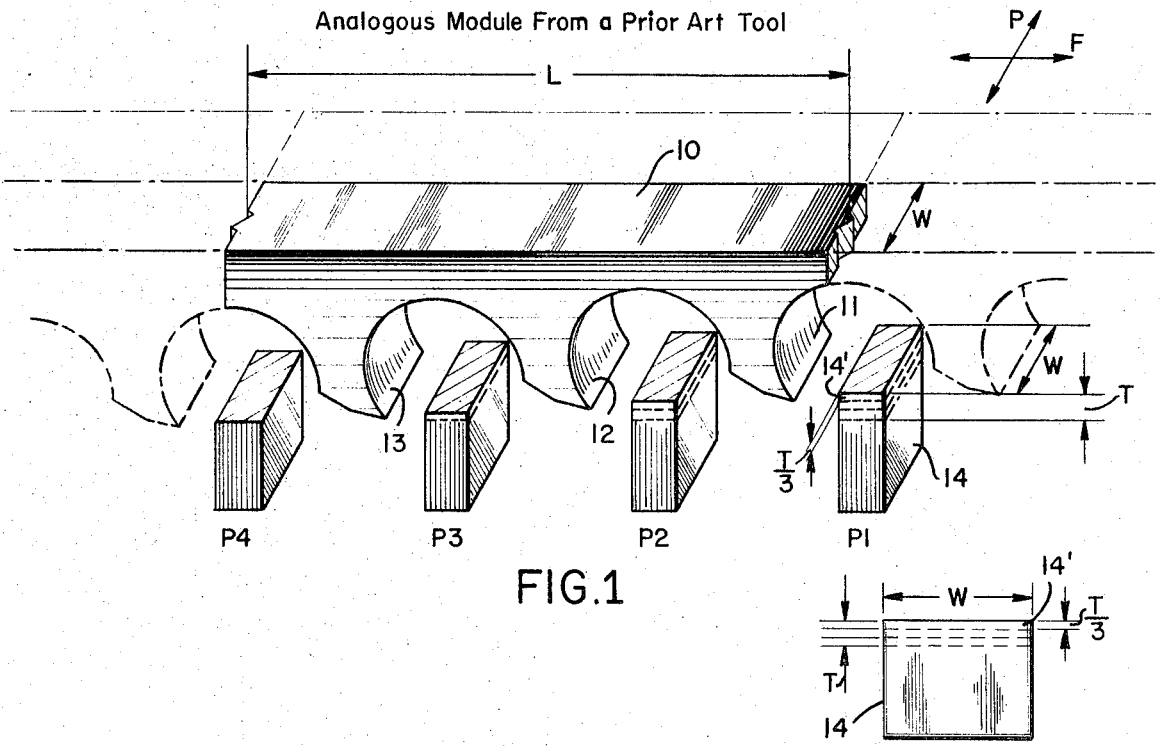
Analogous Module From a Prior Art Tool
FIG.1
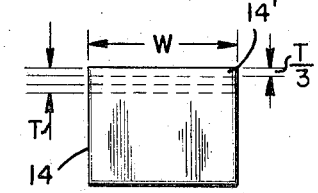
FIG.2
New Module
FIG.3
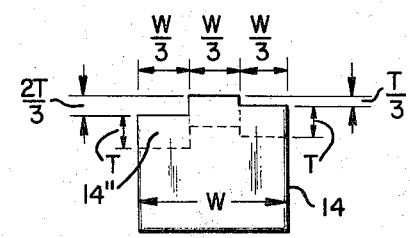
FIG.4

METHOD AND CUTTING EDGE ARRANGEMENT FOR MATERIAL REMOVAL

This application is a continuation-in-part of my co-pending application Ser. No: 167,985 filed Aug. 2, 1971 for "Interrupted Tooth Method and Tools for Material Removal" and now abandoned.

This invention relates to a method and cutting edge arrangement for controlled removal of material from a workpiece.

BACKGROUND OF THE INVENTION

A cutting edge removes material from a workpiece only when the workpiece is caused to move through the path of the cutting edge. Successive cutting edges will enter the path of interference as the cutting edges either rotate and/or translate relative to the translation of the workpiece. As this interference continues, each of the multiple cutting edges removes a chip, the sum of the chips being the total material in the path of interference. It is this interference path and the relative motion of cutting edge and workpiece relative to time that determines the power required to separate it from the parent material. The width of the chip is measured parallel to the cutting edge and is determined by the instantaneous engagement of the cutting edge and workpiece. The thickness of the chip is measured perpendicular to the cutting edge and is determined by the progression of the cutting edge into the workpiece as measured from the surface generated by a previous cutting edge. The length of the chip is determined by the duration of the engagement and is a function of time.

From the foregoing it can be stated that the thickness and width of the chip determines the chip area; this area being independent of the length. For any given chip area, the only variable affecting material removal rate (volume per time) is time to cut the length of the chip. Conversely, if the time to cut the length of the chip is held constant, then the area of the chip must vary if the removal rate is to be increased or decreased.

For any given cutting edge, in combination with any given material, the removal rate is a function of power. It can be demonstrated that power is a function of the total instantaneous contact of the cutting edge with the workpiece, the power decreasing with a decrease in the total instantaneous contact. Therefore, power can be reduced and the same volume of material removed by decreasing the total instantaneous contact of the cutting edge with the workpiece while maintaining the same chip area and length relative to time. From this it will follow that cutting edge and machine tool wear can be reduced per volume of material removed.

BRIEF DESCRIPTION OF THE PRESENT INVENTION

With the foregoing considerations in mind, the present invention contemplates a new modular concept of cutting edge arrangement using a plurality of cutting edges. These cutting edges may be integral (solid), or composited with a holder (inserted). Either configuration (solid or inserted) may be so configured that the entire cutting edge contacts the workpiece simultaneously (called straight), or the cutting edge contacts the workpiece progressively (called spiraled).

The arrangement provides for removal of a volume of material with substantially less power than that required to remove the same volume by an analogous module from a prior art tool operating under the same conditions. A corresponding reduction in the wear on the cutting edge and the machine tool driving the cutting edge is also realized.

Briefly, the invention resides in providing cutting edges arranged with a new module. The arrangement of the cutting edges within the module is controlled in two directions; F, in the direction of relative travel between the module or cutting edge and workpiece; and, P, perpendicular to the direction of relative travel between the module or cutting edge and workpiece. Each cutting edge is so located in the F direction and P direction that it is not in line with any other cutting edge, and the sum of the widths of all cutting edges is equal to the total width in the P direction of the module. A total tool can include any number of modules as continued in either or both directions F and P. The result is the generation of chips with decreased width and increased thickness compared to the chips resulting from an analogous module from a prior art tool, the new chip having the same cross-sectional area but approaching a square.

The steps of the method thus encompass arranging tooth cutting edges to define a new multi-tooth module of given width corresponding to the width of the tooth cutting edge of an analogous module from a prior art tool having a given feed per tooth, wherein no two cutting edges within any one new module are in alignment in a direction either parallel or perpendicular to the relative motion between the module and workpiece; and, providing a width for the cutting edge constituting a fraction of said given width whereby the feed per tooth is increased over said given feed per tooth so that the cross-sectional area of a generated chip of width equal to the width of the cutting edge and thickness equal to the feed per tooth approaches a square.

BRIEF DESCRIPTION OF THE DRAWINGS

A better understanding of the new modular principle and resulting design will be had by referring to the accompanying drawings. Since the same principle applies to straight or spiraled cutters and to solid or inserted cutters, the drawings will illustrate straight solid cutters in order to simplify pictorial representation.

FIG. 1 illustrates an isometric view of a prior art cutting edge arrangement and a column shaped workpiece in four successive positions to illustrate the resulting chip formation. The thickness of the chips are greatly exaggerated for representation purposes stated above.

FIG. 2 is a front elevational of the workpiece of FIG. 1;

FIG. 3 illustrates an isometric view of one example of the new modular cutting edge arrangement of the present invention for cutting an identical column shaped workpiece shown in the same four successive positions; and, FIG. 4 is a front elevational of the workpiece of FIG. 3.

DETAILED DESCRIPTION OF THE INVENTION

Referring to FIG. 1, an analogous prior art tool module in the form of a cutter body 10 includes three cutting edges: 11, 12 and 13 each of a width equal to $W$. In the example shown, the overall length of the module is $L$. Also there is shown a workpiece 14 of width $W$ in four successive positions P1, P2, P3 and P4. The double headed arrow F is the direction of relative motion of the module and workpiece and the double headed arrow P is the direction of the cutting edge or width of the module which is perpendicular to F.

In forcing the cutter 10 and the workpiece 14 to pass each other in the direction of the arrow F, the workpiece 14 moving to the left to assume the four successive positions shown in FIG. 1 and the module or cutter body 10 moving to the right, each cutting edge will successively remove one increment or chip from the top of the column shaped workpiece. The first removed chip is indicated at 14'. Each increment or chip will have a thickness equal to $T/3$ and a width W. The total instantaneous contact per column will be W which corresponds to the given width of the tooth cutting edge of this prior art module. The thickness $T/3$ equals a given feed per tooth.

In FIG. 2, it will be evident that the cross-sectional area of each successively removed chip 14' is $W \times T/3$. The total volume removed by this one module is thus seen to be proportional to $W \times T$, T being the total depth of cut by the successive action of the three teeth making up the module.

Referring now to FIG. 3, there is shown a new module in the form of a cutter body 15 having a given width W corresponding to the width of the tooth cutting edge of the analogous module from a prior art tool shown in FIG. 1. The length of the new module L also corresponds to the length of the module of FIG. 1. In accord with the present, the new module has cutting edges 16, 17, and 18 arranged such that no two cutting edges within the new module are in alignment in a direction F parallel or a direction P perpendicular to the relative motion between the module and workpiece. Each of the cutting edges has a width W/3. Also there is shown the same column shaped workpiece 14.

In forcing the cutter body 15 and the workpiece 14 to pass each other in the same relative manner as described in FIG. 1, each cutting edge will successively remove a newly shaped increment or chip from the top of the column as it successively assumes the positions P1 through P4. Since the cutting edges are not in line along the F direction, each cutting edge must remove a chip 14' of a total thickness of T and a width equal to $W/3$. The total instantaneous contact per workpiece position will be $\frac{2}{3} \times T$ (depth of cut on one side) + $W/3$ + $\frac{1}{3} \times T$ (depth of cut on opposite side) = $T + W/3$. It will be understood that the module ahead of the module 15 will have effected cuts in the workpiece 14 as shown when the workpiece 14 is in the position P1.

In FIG. 4, it will be noted that the chip removed by each tooth designated 14" has a total cross-sectional area of $T \times W/3$. Since there are a total of three chips, the total volume removed by this new module is seen to be proportional to $W \times T$.

Essentially, the width of each cutting edge W/3 for the new module of FIG. 3 constitutes a fraction of the given width W of the analogous module from a prior art tool shown in FIG. 1. Moreover, the feed per tooth has been increased over the given feed per tooth of $T/3$ described with respect to the analogous module of FIG. 1. Thus, the cross sectional area of the generated chip 14" which has a width equal to the width W/3 of the cutting edge and a thickness equal to the increased feed per tooth of T approaches a square.

Comparing the results of FIGS. 1 and 3, it has now been shown that each cutting edge has removed an amount of material equal to $\frac{1}{3}$ ($T \times W$) per workpiece position. While the effect of T on the instantaneous contact of the cutting edge of the cutter of FIG. 1 can be neglected, it must be taken into account in the instantaneous contact of the cutting edge of the cutter 15 of FIG. 2. Assuming a value of W equal to 0.36 and a value of T equal to 0.024, the cutting edge of the teeth of cutter 10 of FIG. 1 has an instantaneous contact value of W or 0.36 per workpiece position and the cutting edge of the teeth on cutter body 11 of FIG. 2 has a value of $T + W/3$ or $0.024 + 0.12$ which equals 0.144 per column position. Thus even though the same total volume of material is removed in both instances, the new module in the form of cutter body 11 has approximately 40 per cent of the instantaneous contact per workpiece position as that experienced by the cutter 10.

As a consequence of the foregoing, a like volume of material may be removed with the new module with substantially less power and corresponding less wear on the cutting edges of the teeth.

In the particular example of the module of FIG. 3, the fraction of the width of each tooth cutting edge is no larger than substantially one half W and in particular is substantially one third W, the feed per tooth being increased over that of FIG. 1 by a factor of three.

It will be understood that any tool may be made up from the new modules by extending them in either or both the T and F directions.

In actuality, maximum material is removed from a workpiece if the cross-sectional area of chip is actually square, that is, if the cutting edge width to the feed per tooth or chip thickness equals one. Thus while the fraction of module width for each tooth cutting edge as described in FIG. 3 is W/3, the smallest fraction or minimum width is actually only limited by technological and economical considerations.

What is claimed is:

1. A method of removing material from a workpiece comprising the steps of:
   a. arranging a given number of tooth cutting edges to define a new multi-tooth module of given total width corresponding to the width W of the tooth cutting edge of an analogous module from a prior art tool having a given feed per tooth, wherein no two cutting edges within any one new module are in alignment in a direction either parallel or perpendicular to the relative motion between the module and workpiece; and
   b. providing a width for each cutting edge constituting a fraction of said given width W, wherein said fraction is equal to said given width W divided by said given number of tooth cutting edges whereby the feed per tooth is increased over said given feed per tooth by a multiple equal to said given number of tooth cutting edges so that the cross-sectional area of a generated chip of width equal to the width of the cutting edge, and thickness equal to the feed per tooth, approaches a square.

2. A tool for removing material from a workpiece comprising: a body member having a number of new multi-tooth modules, each new module having a given total width corresponding to the width W of the tooth cutting edge of an analogous module from a prior art tool having a given feed per tooth, there being provided a given number of tooth cutting edges in each new module arranged such that no two cutting edges within any one new module are in alignment in a direction either parallel or perpendicular to the relative motion between the module and workpiece, the width of each cutting edge constituting a fraction of said given width $W$, wherein said fraction is equal to said given width $W$ divided by said given number of tooth cutting edges whereby the feed per tooth is increased over said given feed per tooth by a multiple equal to said given number of tooth cutting edges so that the cross-sectional area of a generated chip of width equal to the width of the cutting edge, and thickness equal to the feed per tooth, approaches a square.

3. A tool for removing material according to claim 2 in which said given number of tooth cutting edges is two so that said fraction is no larger than substantially one half.

4. A tool for removing material according to claim 2 in which said given number of tooth cutting edges is at least three so that said fraction is at most one third and the feed per tooth is increased by at least three.

* * * * *